United States Patent
Nicolas et al.

(10) Patent No.: US 6,653,396 B2
(45) Date of Patent: Nov. 25, 2003

(54) PROCESS FOR THE PREPARATION OF ZEOLITE A FOR USE IN FORMULATIONS BASED ON TWO-COMPONENT POLYURTHANE RESINS

(75) Inventors: Serge Nicolas, Lons (FR); Paul-Guillaume Schmitt, Asnieres (FR)

(73) Assignee: CECA S.A., Puteaux (FR)

(*) Notice: Subject to any disclaimer, the term of this patent is extended or adjusted under 35 U.S.C. 154(b) by 106 days.

(21) Appl. No.: 10/042,295

(22) Filed: Jan. 11, 2002

(65) Prior Publication Data

US 2002/0141940 A1 Oct. 3, 2002

(30) Foreign Application Priority Data

Jan. 11, 2001 (FR) .............................. 01 00325

(51) Int. Cl.[7] .............................. C08K 3/10; C08K 3/20; C08K 3/34; C08L 75/04; C01B 39/14
(52) U.S. Cl. ................. 524/791; 210/660; 210/665; 210/667; 210/681; 210/687; 423/700; 423/713; 423/714; 423/715; 528/57; 528/58
(58) Field of Search .................. 423/713, 714, 423/715, 700; 524/791; 528/57, 58; 210/660, 665, 667, 681, 687

(56) References Cited

U.S. PATENT DOCUMENTS

| | | | | |
|---|---|---|---|---|
| 3,755,222 A | * | 8/1973 | Gruber et al. .............. | 524/450 |
| 3,907,711 A | * | 9/1975 | Riley et al. ................. | 423/701 |
| 4,251,427 A | * | 2/1981 | Recker et al. .............. | 524/789 |
| 4,341,689 A | * | 7/1982 | Doshi et al. ................ | 523/211 |
| 4,461,631 A | | 7/1984 | Itabashi et al. ................ | 55/66 |
| 4,695,618 A | * | 9/1987 | Mowrer ....................... | 528/55 |
| 4,857,584 A | | 8/1989 | Vandermeersch et al. ... | 524/791 |
| 5,900,226 A | * | 5/1999 | House ......................... | 423/700 |
| 6,051,647 A | * | 4/2000 | House ......................... | 524/590 |

FOREIGN PATENT DOCUMENTS

| | | |
|---|---|---|
| EP | 0310916 | 4/1989 |
| EP | 0346604 | 12/1989 |

* cited by examiner

*Primary Examiner*—Rabon Sergent
(74) *Attorney, Agent, or Firm*—Millen, White, Zelano & Branigan, P.C.

(57) ABSTRACT

Zeolites of type A wherein all the cationic sites of which occupied by sodium, calcium and/or magnesium, potassium and hydronium cations, which exhibit the advantage of having a water adsorption capacity$\geq$23%, which do not adsorb and therefore cannot desorb nitrogen, and which, incorporated in polyurethane (PU) resins, make it possible to increase the potlife of the PU formulations in which they are incorporated. Such zeolites are prepared by a process comprising bringing into contact an aqueous suspension of zeolite 3A, 4A or 5A, an aqueous solution of calcium or potassium salt(s) or solutions of calcium and potassium salt(s), and an acid solution, simultaneously or otherwise and in any order; and in then filtering off and washing the solid obtained, and then drying and activating the zeolite.

19 Claims, No Drawings

PROCESS FOR THE PREPARATION OF ZEOLITE A FOR USE IN FORMULATIONS BASED ON TWO-COMPONENT POLYURTHANE RESINS

The present invention relates to processes and composition based zeolites of type A, the exchangeable cation sites of which are occupied by sodium, potassium, calcium and/or magnesium and hydronium ions, which are particularly effective in formulations based on polyurethane (PU) resins as regards limitation of gaseous inclusions and influence on the potlife.

BACKGROUND

Two-component non-cellular polyurethanes (PU) are resins which are widely used, in particular in the varnish, adhesive, film and coating industry. The surface appearance is a very important characteristic for these applications. These polyurethanes are prepared by addition of di- or polyhydroxyl compounds to di- or polyisocyanates. In point of fact, at the same time as the formation of the urethane bonds, the isocyanates react with the water present in the reaction medium, giving rise to hydrolysed isocyanates which are no longer available for polymerization of the PUs and themselves give rise to carbon dioxide, which, during its release, will create bubbles in the PU and will thus greatly modify, in a harmful fashion, the surface condition of the final PU.

As the hydroxyl compounds available industrially comprise, depending upon their source and their quality, up to 5% by weight of water, it is necessary to prevent the reactions of the isocyanates with the water by adsorbing the water present in the hydroxyl compounds using a suitable drying agent.

FR 1 321 178 or U.S. Pat. No. 3,326,844 discloses the use of zeolite 4A (zeolite of type A, essentially all the exchangeable cationic sites of which are occupied by $Na^+$), zeolite 5A (a portion of the cationic sites is occupied by $Ca^{2+}$, the remainder of the sites being at least predominantly occupied by $Na^+$) and zeolite 13X (NaX) for drying PU resins; these zeolites exhibit the advantage of adsorbing water but the disadvantage of also adsorbing nitrogen, which can be desorbed over time, thus leading to bubbles and gaseous inclusions in the PU resin.

FR 2 049 873 or DE 1 928 219 discloses a process for the preparation of non-cellular PU bodies comprising, as drying agent, a zeolite 3A, 5 to 40% of the cationic sites of which are occupied by sodium ions and 95 to 60% by potassium ions. In point of fact, it has been found that zeolite 3A does not truly constitute an inert filler with regard to the polymerizable system and that, after prolonged storage of the hydroxyl compound with zeolite 3A, it happens that the potlife of the hydroxyl compound/isocyanate compound system is found to be greatly reduced to the point of being too short for correct application of the PU. U.S. Pat. No. 6,051,647 discloses a process for preparing a zeolite of type A, the exchangeable cationic sites of which are occupied by $K^+$, $Na^+$ and $H^+$ cations, from a zeolite 3A (i.e., the exchangeable cationic sites of which are occupied either by potassium ions or by sodium ions) which is treated with an acidic solution so that the pH of this zeolite is between 9.6 and 11. Such a zeolite makes it possible to increase the potlife of PU formulations with respect to that of PU formulations comprising a zeolite 3A. EP 346 604 shows that a zeolite 3A, treated with an acidic solution so that the pH of this zeolite is between 7.5 and 9.5, makes it possible to consequently increase the potlife of PU resins but U.S. Pat. No. 6,051,647 and EP 346 604 are silent on the ability to adsorb nitrogen by these zeolites.

EP 239 706 or U.S. Pat. No. 4,857,584 discloses, as drying agent for PUs, a zeolite of type A, the cationic sites of which are occupied by $Ca^{2+}$, $K^+$ and $Na^+$ or $Mg^{2+}$, $K^+$ and $Na^+$, which is an improvement with respect to zeolites 4A, 3A and 13X as it makes it possible not only to prevent the evolution of $CO_2$ but also the evolution of nitrogen. The potlife of the PUs treated with this additive, although substantially improved with respect to the prior technical solutions, is still insufficient for the requirements of formulators of PU resins.

Accordingly, an object of this invention is to provide an improved zeolite having a zeolite A structure which will avoid at least one of the above described disadvantages.

Another object is to provide a process for producing the improved zeolite A.

Still another object is to provide polyurethane formulation with the comprised zeolite.

Upon further study of the specification and appended claims, further objects and advantages of this invention will become apparent to those skilled in the art.

SUMMARY OF THE INVENTION

To obtain the above objects, there are provided zeolites of type A with an Si/Al atomic ratio of between 0.95 and 1.1, all the cationic sites of which are occupied by sodium, calcium and/or magnesium, potassium and hydronium cations, comprising, given in equivalents:

from 10 to 69%, preferably from 20 to 55%, of sodium ions, from 28 to 55%, preferably from 28 to 40%, of potassium ions, from 2 to 45%, preferably from 10 to 45% and advantageously from 15 to 45% of calcium and/or magnesium ions, and from 1 to 20%, preferably from 2 to 10% and advantageously from 3 to 6% of hydronium ions, the sum of the sodium, potassium, calcium and/or magnesium, and hydronium cations (given in equivalents) being equal to 100%, which exhibit the advantage of having a water adsorption capacity $\geq 23\%$, which do not adsorb and therefore cannot desorb nitrogen, and which, incorporated in PU resins, make it possible to increase the potlife of the PU formulations in which they are incorporated to a markedly greater extent than the zeolitic drying agents as defined in EP 239 706 while not being very sensitive to the age of the hydroxyl compound.

To produce the improved zeolitic drying agent, there is provided a process comprising 1/ bringing the following aqueous solutions or suspensions into contact:

a-i an aqueous suspension of zeolite 3A(a-1), 4A(a-2) or 5A(a-3), b-j an aqueous solution of calcium salt(s) (b-1), or of potassium salt(s) (b-3), or solutions of calcium and potassium salt(s) (b-2), c an acid solution according to one or other of the following methods:
   either a-i, b-j and c simultaneously
   or a-i and b-j, then c,
   or a-i and c, then b-j,
   or b-j and c, then a-i,
   with, in all cases, i and j being identical (which will be indicated subsequently by a-i and b-i, in other words a-1 and b-1 or a-2 and b-2 or a-3 and b-3 can be carried out but not for example a-1 and b-2, a-3 and b-1, etc.), 2/ then filtering off and washing the solid obtained, 3/ then drying and activating, preferably by flushing with a nondecomposing gas, the solid resulting from 2/.

The proportions of the various cations present in the structure of the zeolites are measured conventionally by X-ray fluorescence, the accuracy of the measurements being of the order of 1%.

The term "zeolite 4A" is understood to mean here a zeolite of type A, essentially all the exchangeable cationic sites of which are occupied by $Na^+$.

The term "zeolite 3A" is understood to mean here a zeolite of type A, 28 to 60% (given in equivalents) of the exchangeable cationic sites of which are occupied by potassium ions, the remainder of the sites being occupied by $Na^+$.

The term "zeolite 5A" is understood to mean here a zeolite of type A, at least 40% (given in equivalents) of the cationic sites of which are occupied by $Ca^{2+}$, the remainder of the sites being occupied by $Na^+$.

Within the meaning of the invention, the term "solutions (b-2)", is understood to mean not only solutions which comprise calcium salts and potassium salts but also the combination of a solution of calcium salt(s) (b-1) and of a solution of potassium salt(s) (b-3) with which the reactants (a-2) and (c) are brought into contact: either brought into contact with (b-1) and then with (b-3) or brought into contact with (b-3) and then with (b-1); in other words, in the context of the process according to the invention, (b-2) should also be understood as (b-1) then (b-3) and (b-3) then (b-1).

Within the meaning of the invention, the term "acid solution (c)" should be understood as meaning aqueous solutions of weak and/or strong acid(s), preferably based on strong acid(s), such as sulphuric acid, hydrochloric acid and/or nitric acid, with a normality generally of between 0.1N and 36N and preferably of between 0.5 and 10N.

When the solutions and the suspension are brought into contact simultaneously [(a-i) and (b-i) and (c)], the mixing is generally carried out for a time of less than 1 hour at a temperature generally of between 15 and 80° C.

In the case where, in a first step, the zeolite suspension (a-i) and the acid solution (c) are mixed, the mixing is generally carried out for a few minutes, preferably with stirring, before introducing the saline aqueous solution (b-i), the reaction mixture then being stirred for a time generally of less than 1 hour at a temperature generally of between 15 and 80° C.

In the case where, in a first step, the solution of salt(s) (b-i) and the acid solution (c) are mixed, the mixing is generally carried out for a few minutes, preferably with stirring, before introducing the zeolite suspension (a-i), the reaction mixture then being stirred for a time generally of less than 1 hour at a temperature generally of between 15 and 80° C.

In the 3 cases described above, a solid in suspension is obtained, which solid is filtered off and then washed with water.

In the case where, in a first step, the zeolite suspension (a-i) and the solution of salt(s) (b-i) are mixed, the mixing is generally carried out for a time generally of less than 1 hour, preferably with stirring, and at a temperature generally of between 15 and 80° C.; a suspension of a solid is then obtained, which solid is filtered off and washed with water before being introduced into the acid solution (c), and then the product is filtered off and washed with a mixture of the acid solution and of washing water.

The concentrations and compositions of the solutions of salts and of acid will be adjusted so that the final zeolite corresponds to the formula indicated previously without particular difficulty.

The inventors have found, from the syntheses which they have carried out, that at least 50% of the hydronium ions of the acid solution (c) are exchanged with the other cations present on the starting zeolite.

Once filtered and washed, the solid obtained is subjected to a heat treatment comprising first a stage of drying, generally between 60 and 110° C., for a time generally ranging from approximately half an hour to approximately 2 h, followed by a stage of activation at a temperature generally of between 300 and 600° C., preferably between 350 and 500° C., which is particularly important for the final quality of the zeolite resulting from the process. The inventors have found that, surprisingly, the pH of the zeolites thus prepared increases when the activation temperature increases but also that an increase in the temperature increases the decomposition in crystallinity of the zeolite. Preferably, the activation stage is carried out under gaseous flushing with a nondecomposing gas (air, $N_2$, and the like) which makes it possible to rapidly discharge the water present in the zeolite to prevent its hydrothermal decomposition while limiting the negative effects, indicated above, due to an excessively high activation temperature.

The amount of acid is adjusted so that an activation of between 300 and 600° C., preferably between 350 and 500° C., under gaseous flushing makes it possible to obtain a final product of good quality for the application of drying polyurethanes (water adsorption capacity $\geq 23\%$ (corresponding to the ratio of the increase in the mass of 1 g of activated zeolite after saturation with water on conclusion of a stay of 24 h in a closed chamber at 23±2° C., the relative humidity of which is equal to 50%, to the mass of reference activated zeolite (in this instance 1 g)×100) and pH of between 9.5 and 10.5, measured according to Standard NF EN ISO 787-9:1995). It is found that the more acid (solution c) is added with respect to the starting zeolite present in the suspension (a-i), the lower the pH of the final zeolite and the more the crystallinity of the final zeolite is also found to be reduced.

The resultant zeolites are used in the same manner. Other zeolite A products are used in the prior art, especially for the production of polyurethanes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above or below, and of corresponding French application No. 01/00325, filed Jan. 11, 2001 is hereby incorporated by reference.

EXAMPLE 1

Synthesis of a Zeolite Na—K—Ca—H from 4A Powder in a Single Stage [(a+2)+(b-2)+c]

The suspension (a-2) of zeolite 4A is composed of 28 g of anhydrous 4A powder (100% of the exchangeable cationic sites of which are occupied by sodium ions) and of 56 ml of tap water. The solution (b-2) of salts is composed of 82.6 g of KCl, of 30.5 g of $CaCl_2$ and of 326.5 ml of tap water. The acid solution (c) is composed of 16 ml of 1N HCl.

The suspension (a-2), 56.4 g of solution (b-2) and the solution (c) are introduced simultaneously into a beaker and brought into contact with stirring for 1 h, then filtered off and washed with 420 ml of tap water. The cake thus obtained is subsequently dried at 80° C. for 1 h and then activated under nondecomposing conditions (gaseous flushing with air at approximately 450° C.). The product thus obtained has the following properties:

| Cations of the zeolite prepared in Example 1 (% of the exchangeable sites) | Water adsorption capacity (%) | pH |
|---|---|---|
| $Na^+$:35/$K^+$:29/$Ca^{2+}$:32/$H^+$:4 | 24.0 | 10.0 |

By way of comparison, the preceding suspension (a-2) is brought into contact with 56.4 g of solution (b-2) and the mixture is left stirring for 1 hour before filtering and washing and drying the cake obtained, which exhibits, once activated, the following properties:

| Cations of the zeolite A prepared according to EP 239 706 (% of the exchangeable sites) | Water adsorption capacity (%) | pH |
|---|---|---|
| $Na^+$:36/$K^+$:31/$Ca^{2+}$:33/$H^+$:0 | 25.3 | 10.7 |

EXAMPLES 2 AND 3

Synthesis from 4A Powder with Introduction of the Acid Solution into the Zeolite Suspension Before Introduction of $CaCl_2$ Solution [((a-2)+c) then (b-2)]

The suspension ((a-2)+c) of zeolite 4A is composed of 28 g of anhydrous 4A powder, 46 g of tap water and respectively 26 ml of 1 N $H_2SO_4$ (Example 2) and 13 ml of 1N $H_2SO_4$ (Example 3). This solution is mixed for 15 min. 56.4 g of the solution (b-2) of salts of Example 1 are then introduced and mixing is carried out for 1 h. The recovery of the cake is identical to that described in Example 1. After activation, zeolites A are obtained with the characteristics collated in the table below:

| | Water adsorption capacity (%) | pH |
|---|---|---|
| Cations of the zeolite A prepared in Example 2 (% of the exchangeable sites) | | |
| $Na^+$:33/$K^+$:28/$Ca^{2+}$:30/$H^+$:9 | 22.2 | 10.0 |
| Cations of the zeolite prepared in Example 3 (% of the exchangeable sites) | | |
| $Na^+$:36/$K^+$:29/$Ca^{2+}$:32/$H^+$:3 | 24.0 | 10.2 |

EXAMPLE 4

Synthesis from 4A Powder and Introduction of the Acid into the Solution of $CaCl_2$ Salt Before Introduction into the Zeolite Suspension [((b-2)+c) then (a-2)]

The suspension (a-2) of zeolite 4A is composed of 28 g of anhydrous 4A powder and 46 g of tap water. The solution ((b-2)+c) is composed of 56.4 g of the solution (b-2) of Example 1 and of 20 ml of 1N $H_2SO_4$ (c). The suspension (a-2) and 20 the solution ((b-2)+c) are stirred separately for a few minutes before being mixed and stirred together for 1 hour. The recovery of the cake is identical to that described in Example 1. After activation, a zeolite A is obtained with the characteristics collated in the table below:

| Cations of the zeolite prepared in Example 4 (% of the exchangeable sites) | Water adsorption capacity (%) | pH |
|---|---|---|
| $Na^+$:35/$K^+$:29/$Ca^{2+}$:32/$H^+$:4 | 24.1 | 10.0 |

EXAMPLE 5

Synthesis from 4A Powder with Introduction of the Acid During the Washing [((a-2)+(b-2)) then c]

The suspension (a-2) of zeolite 4A is composed of 28 g of anhydrous 4A powder and of 72 ml of tap water. The suspension (a-2) and 56.4 g of the solution (b-2) of Example 1 are mixed for 1 hour. The cake is then filtered off and washed with a solution (c) comprising 420 ml of tap water and 20 ml of 1N HCl. The cake is subsequently dried and activated as described in Example 1. The powder thus obtained has the following properties:

| Cations of the zeolite prepared in Example 5 (% of the exchangeable sites) | Water adsorption capacity (%) | pH |
|---|---|---|
| $Na^+$:35/$K^+$:29/$Ca^{2+}$:31/$H^+$:5 | 23.6 | 9.9 |

EXAMPLE 6

Synthesis from 3A Powder and Introduction of the Acid into the Solution of $CaCl_2$ Salt Before Introduction into the Zeolite Suspension [((b-1)+c) then (a-1)]

The suspension (a-1) of zeolite 3A is composed of 28 g of zeolite 3A powder (43% of the exchangeable sites of which are occupied by potassium ions and 57% by sodium ions) and of 82 g of tap water. The solution ((b-1)+c) of salts is composed of 2.72 g of $CaCl_2$, 48 ml of tap water and 16 ml of 1N HCl.

The suspension (a-1) and the solution ((b-1)+c) are brought into contact for 15 min with stirring. The cake produced is then filtered off, washed with 420 ml of tap water, dried and activated at 450° C. The powder thus obtained has the following properties:

| Cations of the zeolite prepared in Example 6 (% of the exchangeable sites) | Water adsorption capacity (%) | pH |
|---|---|---|
| $Na^+$:36/$K^+$:32/$Ca^{2+}$:28/$H^+$:4 | 24.2 | 10.0 |

EXAMPLE 7

Influence of the Activation

The dried powder resulting from Example 6 is subjected to various heat treatments which are combined in the following table:

| Temperature (° C.) | Ventilation of the oven | pH | Water adsorption capacity (%) |
|---|---|---|---|
| 400 | No | 9.95 | 22.6 |
| 450 | No | 10 | 21.5 |
| 550 | No | 10.15 | 21.4 |
| 400 | Yes | 9.95 | 24.5 |
| 450 | Yes | 10 | 24.1 |
| 550 | Yes | 10.15 | 22.8 |

The proportions of the various cations present in the structures of the zeolites (no influence of the activation temperature and of the optional the oven).

EXAMPLE 8

Synthesis from 3A Powder with Introduction of Acid into the Solution of $MgCl_2$ Salt Before Introduction into the Zeolite Suspension [((b-1)+c) then (a-1)]

The operating conditions described in Example 6 are repeated, with the exception the $CaCl_2$ solution, which is replaced by an aqueous $MgCl_2$ solution prepared from 48 ml of water and 2.72 g of $MgCl_2$; subsequently, 0, 16 and 20 ml respectively of 1N HCl solution are introduced. The products obtained have the following properties:

| Amount of acid introduced (ml of 1N HCl)/ Cations of the zeolite | Water adsorption capacity (%) | pH |
|---|---|---|
| 0<br>$Na^+$:41%/$K^+$:34%/$Mg^{2+}$:25%/$H^+$:0% | 27.6 | 11.0 |
| 16<br>$Na^+$:34%/$K^+$:33%/$Mg^{2+}$:25%/$H^+$:8% | 24.9 | 10.3 |
| 20<br>$Na^+$:33%/$K^+$:32%/$Mg^{2+}$:25%/$H^+$:10% | 24.1 | 10.1 |

EXAMPLE 9

Influence of the Concentration of Acid

Various powders are synthesized according to the procedure described in Example 6 with amounts of 1N HCl acid introduced of 12, 16, 20 and 26 ml respectively. The results are combined in the following table:

| Amount of acid introduced (ml of 1N HCl) Cations of the zeolite | Water adsorption capacity (%) | pH |
|---|---|---|
| 12<br>$Na^+$:37%/$K^+$:33%/$Mg^{2+}$:28%/$H^+$:2% | 24.6 | 10.15 |
| 16<br>$Na^+$:36%/$K^+$:32%/$Mg^{2+}$:28%/$H^+$:4% | 24.2 | 10.0 |
| 20<br>$Na^+$:35%/$K^+$:32%/$Mg^{2+}$:28%/$H^+$:5% | 23.7 | 9.9 |
| 26<br>$Na^+$:34%/$K^+$:31%/$Mg^{2+}$:27%/$H^+$:8% | 21.4 | 9.85 |

When the above zeolites of the invention are used in the preparation of polyurethanes, the pot life of polyurethanes is extended and nitrogen bubbles do not occur.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the preparation of zeolites having a zeolite A structure with an Si/Al atomic ratio of between 0.95 and 1.1, all the cationic sites of which are occupied by sodium, calcium and/or magnesium, potassium and hydronium cations, comprising, given in equivalents:

from 10 to 69% of sodium ions,
   from 28 to 55% of potassium ions,
   from 2 to 45% of calcium and/or magnesium ions,
   and from 1 to 20% of hydronium ions,
   the sum of the sodium, potassium, calcium and/or magnesium, and hydronium cations (given in equivalents) being equal to 100%, said process comprising the following stages:
   1/ bringing the following aqueous solutions or suspensions into contact:
      a-i an aqueous suspension of zeolite 3A(a-1), 4A(a-2) or 5A(a-3),
      b-j an aqueous saline solution of calcium salt(s) (b-1), or of potassium salt(s) (b-3), or solutions of calcium and potassium salt(s) (b-2),
      c an acid solution
   according to one or other of the following methods:
      either a-i, b-j and c simultaneously
      or a-i and b-j, then c,
      or a-i and c, then b-j,
      or b-j and c, then a-i,
   with, in all cases, i and j being identical,
   2/ then filtering off and washing the solid obtained,
   3/ then drying and activating by heat treatment, the solid resulting from 2/.

2. A process according to claim 1, according to which the solutions and the suspension are brought into contact (1/) simultaneously (b-j) and the mixture is stirred, at a temperature of between 15 and 80° C., and then the solid obtained is filtered off and then washed with water (2/) before being subjected to the heat treatment 3/.

3. A process according to claim 2, wherein the mixture is stirred for not more than one hour.

4. A process according to claim 1, according to which first the zeolite suspension (a-i) and the acid solution (c) are mixed before introducing the aqueous saline solution (b-j), the reaction mixture then being stirred, at a temperature generally of between 15 and 80° C., (1/) and then the solid obtained is filtered off and washed with water (2/) before being subjected to the heat treatment 3/.

5. A process according to claim 4, wherein the reaction mixture is stirred for not more than one hour.

6. A process according to claim 1, according to which first the solution of salt(s) (b-j) and the acid solution (c) are mixed, before introducing the zeolite suspension (a-i), the reaction mixture then being stirred, at a temperature of between 15 and 80° C., (1/) and then the solid obtained is filtered off and washed with water (2/) before being subjected to the heat treatment 3/.

7. A process according to claim 6, wherein the reaction mixture is stirred for not more than one hour.

8. A process according to claim 1, according to which first the zeolite suspension (a-i) and the solution of salt(s) (b-j) are mixed at a temperature of between 15 and 80° C., (1/) then the suspended solid obtained is filtered off and washed with water before being introduced into the acid solution (c), and then the solid obtained from the coat acting with the acid solution (c) is filtered off and washed (2/) with a mixture of the acid solution and of washing water.

9. A process according to claim 8, wherein the mixture of the zeolite suspension (a-i) and the solution of salt(s) (b-j) is stirred for not more than one hour.

10. A process according to claim 1, according to which the heat treatment of stage 3/ comprises first a stage of drying at a drying temperature followed by a stage of activation at a substantially higher temperature than said drying temperature.

11. A process according to claim 10, wherein said drying temperature is between 60 and 110° C. and the activation temperature is between 300 and 600° C.

12. A process according to claim 11, wherein the activation temperatures between 350 and 500° C.

13. A process according to claim 10, according to which the activation is carried out under gaseous flushing with a nondecomposing gas.

14. A process according to claim 1, wherein all the cationic sites of which are occupied by sodium, calcium and/or magnesium, potassium and hydronium cations, comprising, given in equivalents:

from 20 to 55% of sodium ions, from 20 to 40% of potassium ions, from 10 to 45% of calcium and/or magnesium ions, and from 2 to 10% of hydronium ions.

15. A process according to claim 1, wherein all the cationic sites of which are occupied by sodium, calcium and/or magnesium, potassium and hydronium cations, comprising, given in equivalents:

from 20 to 55% of sodium ions, from 20 to 40% of potassium ions, from 15 to 15% of calcium and/or magnesium ions, and from 3 to 6% of hydronium ions.

16. A zeolite having a structure with an Si/Al atomic ratio of between 0.95 and 1.1, all the cationic sites of which are occupied by sodium, calcium and/or magnesium, potassium and hydronium cations, comprising, given in equivalents:

from 10 to 69% of sodium ions, from 28 to 55% of potassium ions, from 2 to 45% of calcium and/or magnesium ions, and from 1 to 20% of hydronium ions, the sum of the sodium, potassium, calcium and/or magnesium, and hydronium cations (given in equivalents) being equal to 100%, having a water adsorption capacity of at least 23% by weight.

17. A zeolite prepared by the process of claim 1.

18. In a process of producing a polyurethane by addition of di- or polyhydroxyl compounds to di- or polyisocynates, in the presence of a zeolite, the improvement wherein the zeolite is a zeolite in accordance with claim 16.

19. A polyurethane composition produced by the process of claim 18.

* * * * *

UNITED STATES PATENT AND TRADEMARK OFFICE
CERTIFICATE OF CORRECTION

PATENT NO.    : 6,653,396 B2
DATED         : November 25, 2003
INVENTOR(S)   : Serge Nicolas et al.

It is certified that error appears in the above-identified patent and that said Letters Patent is hereby corrected as shown below:

Column 10,
Line 9, change "from 15 to 15%" to -- from 15 to 45% --.

Signed and Sealed this

Tenth Day of August, 2004

JON W. DUDAS
*Acting Director of the United States Patent and Trademark Office*